United States Patent [19]

Matsuda

[11] Patent Number: 4,676,353
[45] Date of Patent: Jun. 30, 1987

[54] LOCK-UP TORQUE CONVERTER CONTROL COMBINED WITH ANTI-SKID BRAKE CONTROL

[75] Inventor: Toshiro Matsuda, Sagamihara, Japan
[73] Assignee: Nissan Motor Co., Ltd., Yokohama, Japan
[21] Appl. No.: 666,446
[22] Filed: Oct. 30, 1984

[30] Foreign Application Priority Data
Nov. 9, 1983 [JP] Japan .................. 58-208960

[51] Int. Cl.$^4$ .......................................... B60K 41/24
[52] U.S. Cl. ..................... 192/13 R; 192/3.23; 192/3.29; 192/3.31; 192/4 A; 303/109
[58] Field of Search ............ 192/4 A, 13 R, 3.23, 192/3.24, 3.29, 0.094, 0.082, 3.31; 303/96, 109, 111

[56] References Cited

U.S. PATENT DOCUMENTS

| 3,586,920 | 6/1971 | Wakamatsu et al. | 192/0.055 X |
|---|---|---|---|
| 3,610,362 | 10/1971 | Toyama | 180/82 |
| 3,637,057 | 1/1972 | Okamoto | 192/13 R |
| 3,848,933 | 11/1974 | Ochiai | 303/109 |
| 3,863,730 | 2/1975 | Wakamatsu et al. | 180/82 |
| 3,866,981 | 2/1975 | Klatt | 303/111 X |
| 3,912,340 | 10/1975 | Bertolasi | 303/109 X |
| 4,370,715 | 1/1983 | Leiber | 303/109 X |
| 4,431,095 | 2/1984 | Suga | 192/3.29 X |
| 4,478,322 | 10/1984 | Carlson et al. | 192/0.055 |
| 4,491,919 | 1/1985 | Leiber | 303/111 X |

FOREIGN PATENT DOCUMENTS

| 0040301 | 11/1981 | European Pat. Off. . | |
|---|---|---|---|
| 75256 | 3/1983 | European Pat. Off. | 74/645 |
| 0106112 | 4/1984 | European Pat. Off. . | |
| 2251548 | 4/1973 | Fed. Rep. of Germany . | |
| 2320559 | 11/1974 | Fed. Rep. of Germany | 303/111 |
| 57-192668 | 11/1982 | Japan . | |

Primary Examiner—Rodney H. Bonck
Assistant Examiner—David A. Testardi
Attorney, Agent, or Firm—Schwartz, Jeffery, Schwaab, Mack, Blumenthal & Evans

[57] ABSTRACT

A lock-up torque converter control system is combined with an anti-skid brake control system so as not to hamper the control action of the anti-skid brake control system. A lock-up clutch of the lock-up torque converter is engaged when the vehicle is in a predetermined running condition, and disengaged when the vehicle is out of the predetermined running condition. There is further provided lock-up inhibit means for holding the lock-up clutch disengaged by preventing the control action of the lock-up torque converter control system while the anti-skid brake control system is in operation.

14 Claims, 6 Drawing Figures

LOCK-UP TORQUE CONVERTER CONTROL COMBINED WITH ANTI-SKID BRAKE CONTROL

BACKGROUND OF THE INVENTION

The present invention relates to a system for controlling a lock-up torque converter of an automatic transmission mounted on a vehicle equipped with an anti-skid brake control system (a wheel slip brake control system).

Japanese Patent provisional publications Nos. 54-132062, 55-109854 and 56-127856 disclose lock-up torque converters having a lock-up clutch disposed between input and output members of a hydrodynamic drive to provide a direct mechanical drive. In a conventional automatic transmission having such a lock-up torque converter, the lock-up clutch is controlled by a control unit in accordance with a vehicle speed determined from an output signal of a wheel speed sensor or the like. A lock-up vehicle speed and a release vehicle speed equal to or lower than the lock-up vehicle speed are predetermined for each gear position of the transmission. When the vehicle speed exceeds the predetermined lock-up speed, the control unit makes the lock-up clutch engage by sending a lock-up control signal to a lock-up solenoid for switching hydraulic fluid passage in the torque converter. When the vehicle speed decreases to the predetermined release vehicle speed, the control unit deactivates the lock-up solenoid, so that the lock-up clutch is disengaged. In this case, there is some delay (normally, about 0.2 to 0.3 second) between the deactivation of the lock-up solenoid and the complete disengagement of the lock-up clutch because the lock-up clutch is operated by the hydraulic system. Consequently, there is a possibility that during hard braking the vehicle speed will decrease into an engine stall range before the lock-up clutch is disengaged.

Japanese Patent provisional publication No. 57-192668 proposes an lock-up torque converter control system arranged to prevent engine stall during hard braking. In this control system, the lock-up clutch is controlled in accordance with not only the vehicle speed but also the deceleration. If the deceleration exceeds a predetermined value, the control unit of this control system commands the lock-up solenoid to disengage the lock-up clutch even before the vehicle speed decreases to the predetermined release speed. However, this lock-up torque converter control system is not satisfactory when it is applied to a vehicle equipped with an anti-skid brake control system.

SUMMARY OF THE INVENTION

It is an object of the present invention to provide a lock-up torque converter control system so combined with an anti-skid brake control system that the control action of the anti-skid brake control system can always work properly.

According to the present invention, a vehicle comprises a brake system, condition detecting means for detecting a running condition of the vehicle, anti-skid brake control means, an automatic transmission having a torque converter and a lock-up mechanism to provide a direct mechanical drive, lock-up actuating means for actuating the lock-up mechanism, lock-up control means, and lock-up inhibit means. The anti-skid brake control means is connected with the condition detecting means for automatically controlling a brake actuation force during braking in accordance with the running condition detected by the condition detecting means. The lock-up mechanism is engaged so that power can be transmitted through the mechanical drive when the lock-up actuating means is in a lock-up state. The lock-up mechanism is disengaged so that power cannot be transmitted through the mechanical drive when the lock-up actuating means is in a release state. The lock-up control means is connected with the condition detecting means for engaging and disengaging the lock-up mechanism by putting the lock-up actuating means in the lock-up state and in the release state in accordance with the running condition detected by the condition detecting means. The lock-up inhibit means detects the operation of the anti-skid control means and holds the lock-up actuating means in the release state by preventing the control action of the lock-up control means while the anti-skid control means is controlling the brake actuation force.

DETAILED DESCRIPTION OF THE INVENTION

Figure 1:
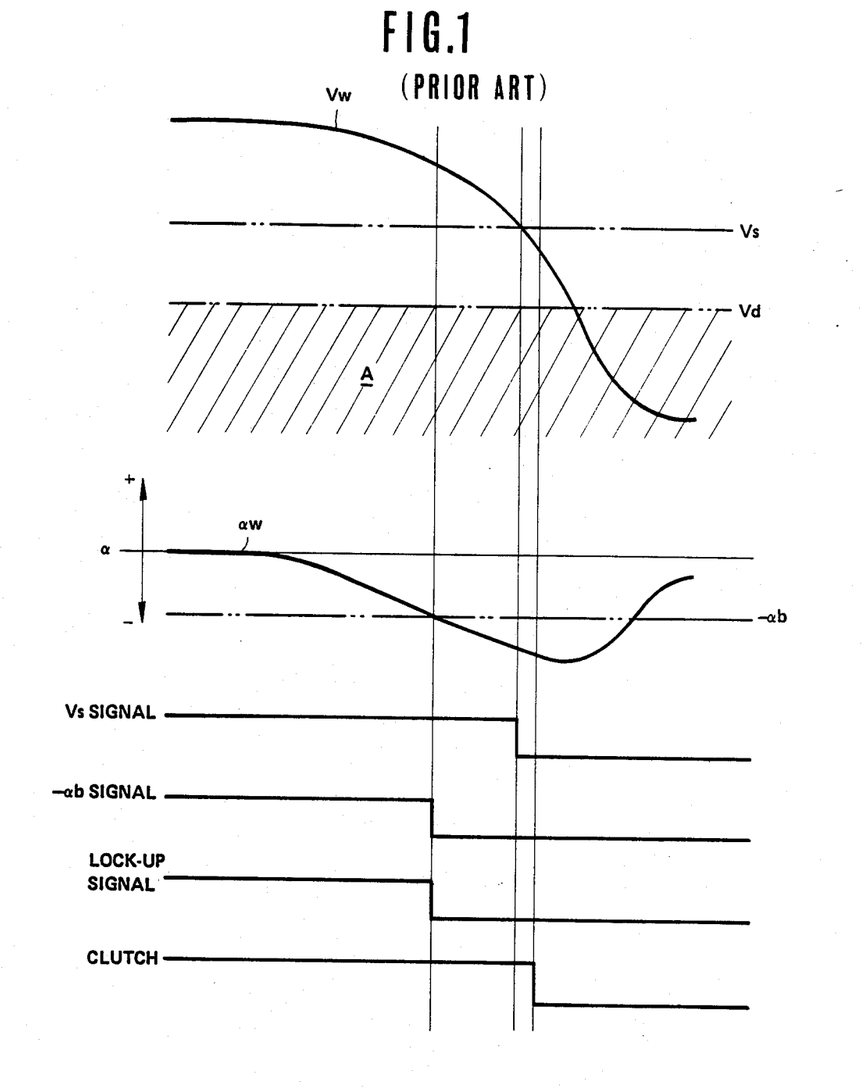
FIGS. 1 and 2 are timing charts for showing the behavior of a conventional lock-up torque converter control system.

FIG. 1 shows the operation of the lock-up torque converter control system of Japanese Patent provisional publication No. 57-192668 mentioned above. In this system, the lock up control signal is shut off or changed to the low level before the vehicle speed Vw reaches a predetermined release vehicle speed Vs if the deceleration exceeds a predetermined value $-\alpha b$. Therefore, in spite of a delay between the change of the lock-up control signal and the disengagement of the lock-up clutch, the lock-up clutch is disengaged before the vehicle speed reaches an engine stall range A below an engine stall vehicle speed Vd.

Figure 2:
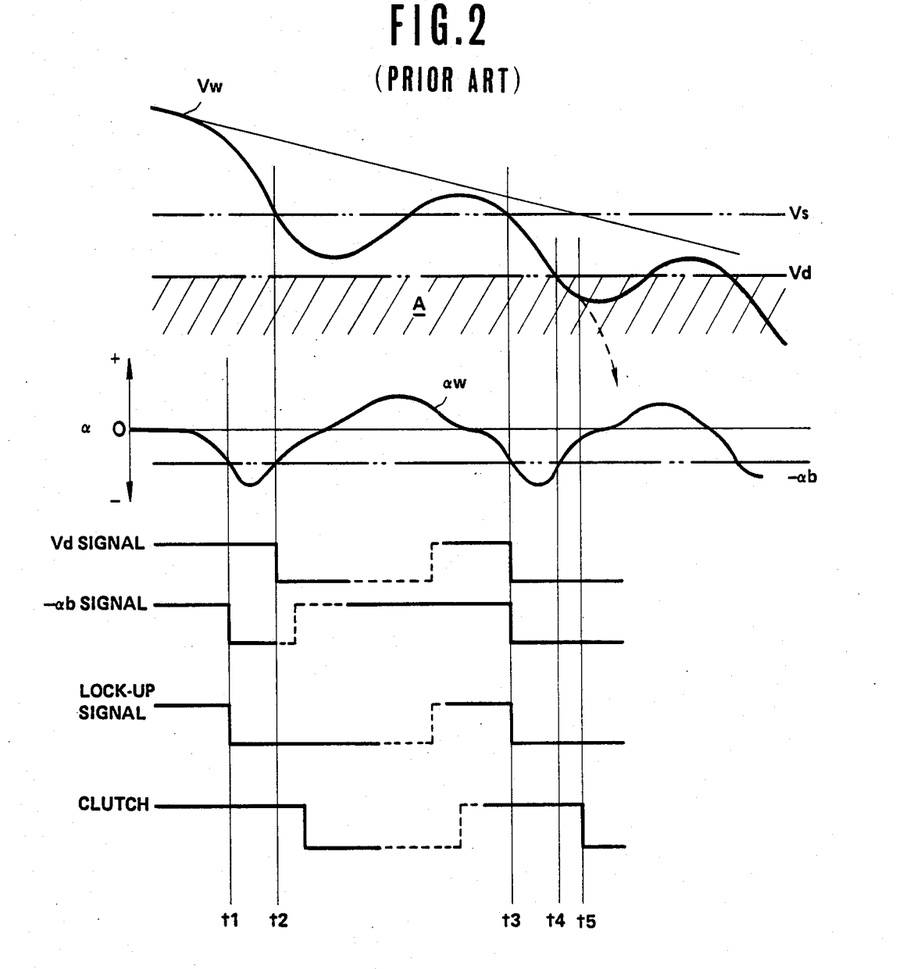

FIG. 2 shows the behavoir of the lock-up torque converter control system of FIG. 1, applied to a vehicle equipped with an anti-skid brake control system. Normally, the vehicle speed and the deceleration are determined by detecting the wheel speed. As shown in FIG. 2, the wheel speed Vw oscillates largely (in such a manner that the wheel acceleration $\alpha w$ oscillates from about $-20$ G to about 10 G) with a very short period (about 0.5 second) during the operation of the anti-skid brake control system. Therefore, there still remains a possibility that the engine of the vehicle stalls because of a rapid decrease of the wheel speed before disengagement of the lock-up clutch, especially when the wheel speed is in a low wheel speed range (from an instant $t_3$ to an instant $t_5$ in FIG. 2). If such an engine stall occurs on a low friction road surface, the engine brake torque so increases that the wheels of the vehicle are locked, and the operation of the anti-skid brake control is damaged. In addition, the wheel rotation fluctuates each time the lock-up clutch is engaged or disengaged. If such a fluctuation of the wheel rotation occurs during the operation of the anti-skid brake control, it is liable to cause a malfunction of the anti-skid brake control system of the type in which the brakes are controlled in accordance with the acceleration of the wheel rotation.

Figure 3:
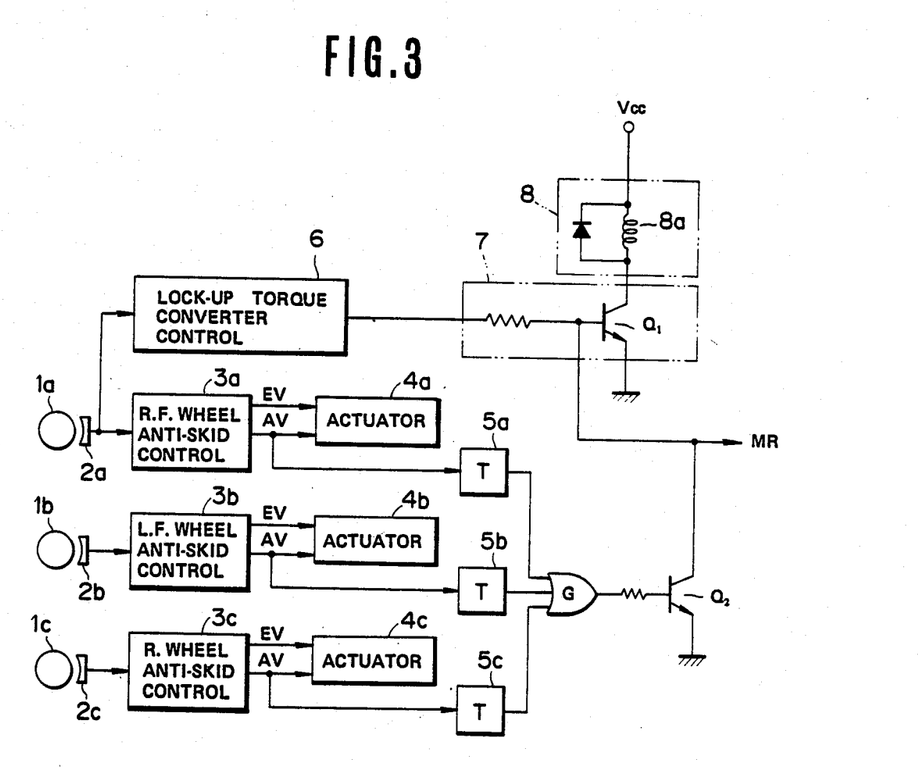
FIG. 3 is a block diagram showing one embodiment of the present invention.

One embodiment of the present invention is shown in the block diagram of FIG. 3. In this embodiment the present invention is applied to a front engine rear wheel drive vehicle having three anti-skid brake control (wheel slip brake control) systems for a right front wheel, a left front wheel and rear wheels.

This vehicle has a right front wheel speed sensor $2a$ for a right front wheel $1a$, a left front wheel speed sensor $2b$ for a left front wheel $1b$, and a rear wheel speed sensor $2c$ for a rear wheel $1c$. The wheel speed sensors $2a$, $2b$ and $2c$ are connected, respectively, to anti-skid brake control circuits $3a$, $3b$ and $3c$, each of which produces an anti-skid brake control signal (an EV signal and an AV signal). The anti-skid brake control circuits $3a$, $3b$ and $3c$ are connected, respectively, to a right front anti-skid actuator $4a$ disposed in a hydraulic circuit for the brake of the right front wheel, a left front anti-skid actuator $4b$ disposed in a hydraulic circuit for the brake of the left front wheel, and a rear anti-skid actuator $4c$ disposed in a hydraulic circuit for the brakes of the rear wheels.

Figure 5:
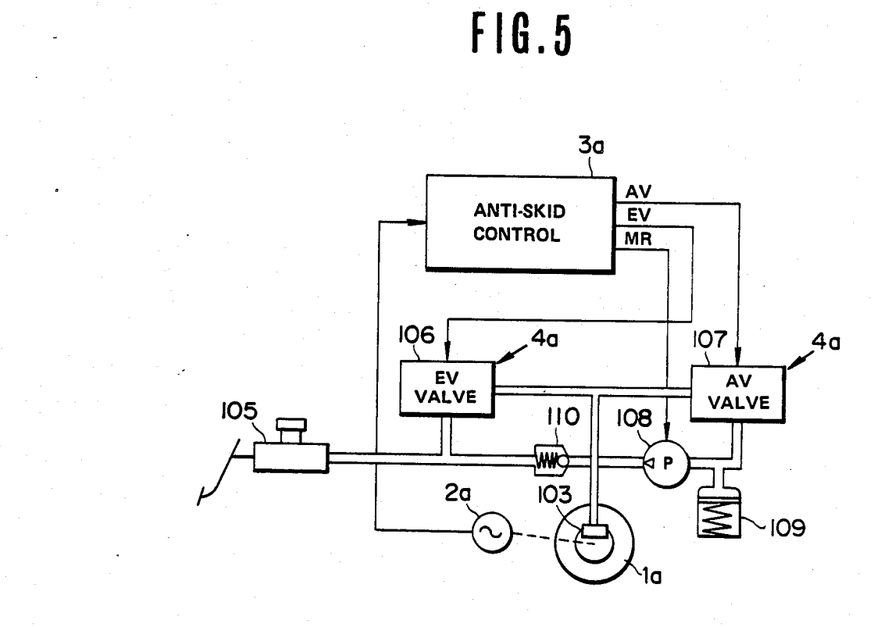
FIG. 5 is a view of a hydraulic circuit of an anti-skid brake control system used in the embodiment of the present invention.

The anti-skid actuators $4a$, $4b$ and $4c$ are identical with one another. FIG. 5 shows the actuator $4a$, as an example. The anti-skid actuator $4a$ comprises an inlet valve (an EV valve) 106 disposed in a fluid passage for transmitting the brake fluid pressure from a master cylinder 105 to a wheel cylinder 103, and an outlet valve (an AV valve) 107 disposed in a fluid passage for returning the brake fluid pressure from the wheel cylinder 103 to the master cylinder 105 by the aid of a fluid pump 108, an accumulator 109 and a check valve 110.

Figure 6:
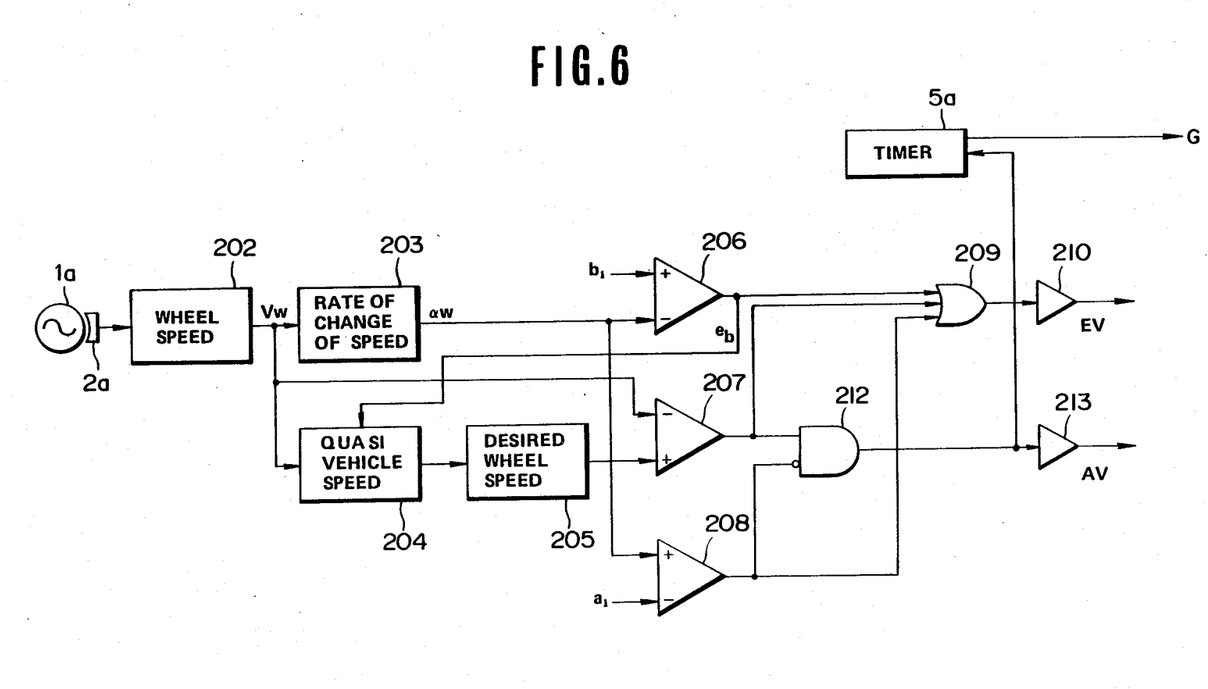
FIG. 6 is a view showing the anti-skid brake control circuit shown in FIG. 5.

Each of the anti-skid brake control circuits $3a$, $3b$ and $3c$ calculates a wheel speed and a rate of change of the wheel speed with respect to time (acceleration or deceleration) from an output signal of the associated wheel speed sensor $2a$, $2b$ or $2c$. In accordance with the calculated wheel speed and the calculated rate of change of the wheel speed, each of the anti-skid brake control circuits $3a$, $3b$ and $3c$ produces an anti-skid control signal to control the associated anti-skid actuator $4a$, $4b$ or $4c$. In this embodiment, the anti-skid control signal of each anti-skid control circuit comprises an EV signal to control the inlet valve 106, and and AV signal to control the outlet valve 107. The anti-skid control circuits $3a$, $3b$ and $3c$ are identical with one another. FIG. 6 shows the circuit $3a$ as an example. The wheel speed sensor $2a$ produces an A.C. signal or other periodic signal having a frequency proportional to the rotational speed of the wheel $1a$. The wheel speed sensor $2a$ is connected to a wheel speed detecting circuit 202 of the anti-skid brake control circuit $3a$. The wheel speed detecting circuit 202 is a frequency to voltage converter which provides an output voltage signal proportional to the frequency of the signal of the wheel speed sensor $2a$. Accordingly, the outputs signal of the wheel speed detecting circuit 202 is indicative of the wheel speed Vw. A deceleration detection circuit 203 receives the voltage signal of the wheel speed detection circuit 202, differentiates the wheel speed Vw, and determines a deceleration $\alpha w$ of the wheel. A comparator 206 compares the deceleration $\alpha w$ determined by the deceleration detection circuit 203 with a predetermined deceleration $b_1$. The output of the comparator 206 rises from a low (L) level to a high (H) level when the absolute valve of the deceleration $\alpha w$ (which is negative) exceeds the absolute value of the predetermined deceleration $b_1$ (which is negative). A quasi vehicle speed generator 204 generates a target straight line $V_0$ approximately equal to the actual vehicle speed each time an eb signal, whichis the output signal of from the comparator 206, rises from the low level to the high level because of a decrease of the rate of change of the wheel speed below the predetermined deceleration. A desired wheel speed generator 205 multiplies the value of the target line $V_0$ by a predetermined coefficient, and thereby generates a desired straight line $V_1$ which defines a boundary between a $\lambda_0$ zone (in which the rate of wheel slip is equal to or lower than 15%, for example) and a $\lambda_1$ zone (in which the rate of wheel slip is greater than 15%, for example). A comparator 207 compares the wheel speed Vw with the desired straight line $V_1$. The output of the comparator 207 falls from the high level to the low level when the wheel speed Vw exceeds $V_1$. An AND gate 212 is connected with comparator 207 and a compartor 208. On the condition that the output of the comparator 208 is at the low level, the AND gate 212 provides an output which is in the high level when the vehicle speed is within the $\lambda_1$ zone, that is, when the vehicle speed Vw is smaller than $V_1$. The output of the AND gate 212 is forced into the low level when the wheel speed Vw exceeds $V_1$, that is, when the wheel speed enters the $\lambda_0$ zone. The comparator 208 compares the wheel deceleration $\alpha w$ with a predetermined acceleration $a_1$. The output of the comparator 208 rises from a low level to a high level when $\alpha w$ exceeds $a_1$. The output signals of the comparators 206, 207 and 208 are inputted to an OR gate 209. An amplifier 210 receives the output signal of the OR gate 209 and produces the EV signal. An amplifier 213 receives the output signal of the AND gate 212 and produces the AV signal. The output terminal of the comparator 208 is connected to the OR gate 209 and the AND gate 212 so that, when the acceleration is equal to or greater than the predetermined acceleration $a_1$, the high output of the comparator 208 forces the EV signal into the high level and the AV signal into the low level to hold the brake pressure unchanged.

Each anti-skid actuator $4a$, $4b$ or $4c$ receives the EV signal and the AV signal from the associated anti-skid control circuit $3a$, $3b$ or $3c$. In accordance with the EV and AV signals, each anti-skid actuator decreases, holds unchanged or increases the brake fluid pressure of the associated hydraulic circuit, as shown in Table-1 below.

TABLE 1

| Signal | Mode | | |
|---|---|---|---|
| | Increase Pressure | Hold Pressure Unchanged | Decrease Pressure |
| EV Signal | L | H | H |
| AV Signal | L | L | H |

Timers $5a$, $5b$ and $5c$ are connected with the anti-skid control circuits $3a$, $3b$ and $3c$, respectively. Each of the timers $5a$, $5b$ and $5c$ is triggered by a rise of the AV signal, and held in an active state for a predetermined time interval (about two seconds) which is equal to or greater than the greatest period of the brake-release cycle of the anti-skid brake control system within a normal range of possibility. Each timer is re-triggerable.

That is, if one or more trigger signal is applied to the timer while the timer is already in the active state, then the timer is triggered again by each trigger signal and held in the active state until the predetermined time interval starting from the last trigger signal is elapsed. The timers 5a, 5b and 5c are connected to an OR gate G whose output signal (which is referred to as MR signal) is normally used to actuate the motor of the pump of each hydraulic circuit for returning the fluid pressure from the wheel cylinder to the master cylinder.

A lock-up torque converter control circuit 6 controls a lock-up torque converter of an automatic transmission according to the characteristic shown in FIG. 1. In this embodiment, the lock-up control circuit 6 is connected with the right front wheel speed sensor 2a. From the output signal of the right front wheel speed sensor 2a, the lock-up control circuit 6 calculates the wheel speed and the rate of change of the wheel speed. When the calculated wheel speed reaches a predetermined lock-up vehicle speed, the lock-up control circuit 6 produces a high level lock-up control signal. If the calculated wheel speed decreases to a predetermined release vehicle speed, or if the calculated rate of change of the wheel speed reaches a predetermined deceleration $-\alpha b$, the lock-up control circuit 6 changes the lock-up control signal from the high level to the low level. The lock-up control signal is applied to the base of a switching transistor $Q_1$ which is a constituent member of a lock-up actuating circuit 7. When the switching transistor $Q_1$ is turned on by the lock-up control signal of the high level, a coil 8a of a lock-up solenoid 8 is energized by a power supply Vcc.

The output signal of the OR gate G whose inputs are connected with the timers 5a, 5b and 5c is applied to the base of a switching transistor $Q_2$. The collector of the switching transistor $Q_2$ is connected with the base of the switching transistor $Q_1$. The emitter of the switching transistor $Q_2$ is grounded. When the switching transistor $Q_2$ is turned on, the base of the switching transistor $Q_1$ is held in the low level.

The thus constructed control system is operated as follows:

When the vehicle is running in a normal manner, the lock-up torque converter is controlled according to the characteristic shown in FIG. 1. If the wheel speed decreases to the release vehicle speed, or if the rate of change of the wheel speed reaches the predetermined deceleration $-\alpha b$, the lock-up control circuit 6 changes the lock-up control signal to the low level. In response to the change of the lock-up control signal to the low level, the switching transistor $Q_1$ is switched off, and the coil 8a of the lock-up solenoid 8 is deenergized. Therefore, the lock-up clutch is disengaged, and the torque converter is released.

Figure 4:
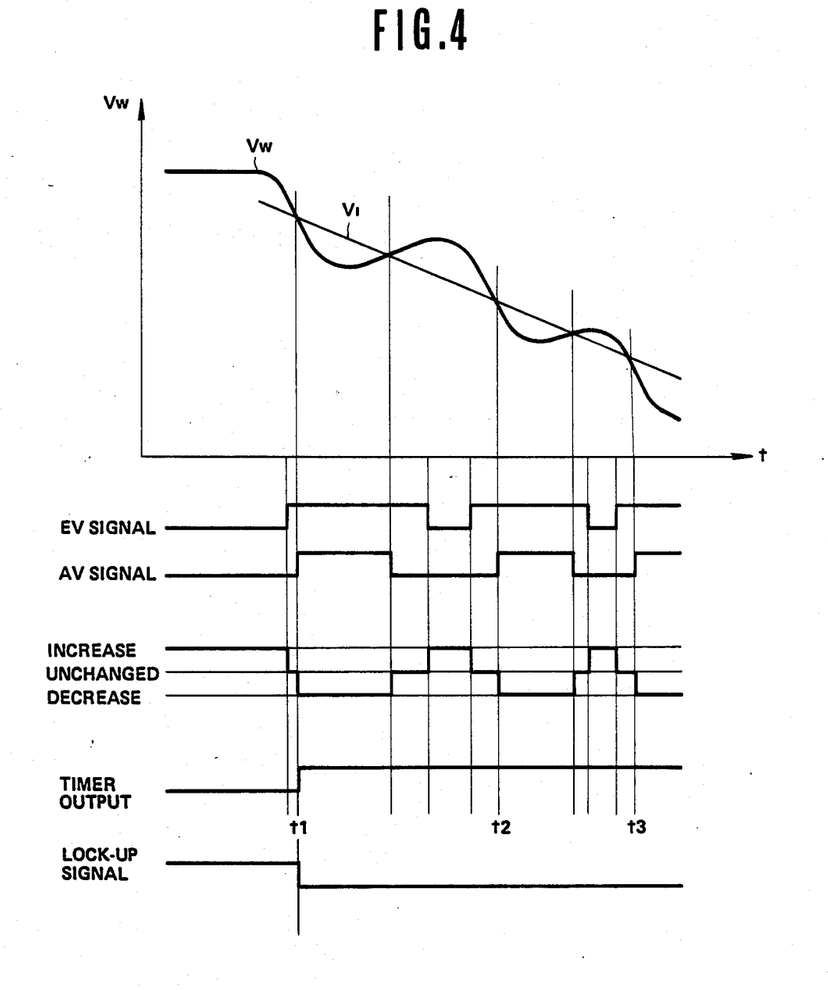
FIG. 4 is a timing chart showing the operation of the control system of FIG. 3.

If the brakes are applied hard, and the rate of change of the wheel speed reaches the predetermined deceleration, each of the anti-skid brake control circuits 3a, 3b and 3c starts the brake control operation by sending the EV and AV signals to its actuator 4a, 4b or 4c. In accordance with the EV and AV signals, the inlet and outlet valves of each actuator are switched sequentially among the control mode to increase the brake fluid pressure, the control mode to hold the fluid pressure unchanged and the control mode to decrease the fluid pressure, as shown in FIG. 4. Accordingly, the wheel speed Vw decreases while oscillating so that the wheel speed Vw is alternately greater and smaller than the desired wheel speed $V_1$ at which the brake efficiency is maximum, as shown in FIG. 4.

When the AV signal first rises from the low level to the high level at an instant $t_1$ shown in FIG. 4 after the start of the control operation of each anti-skid brake control circuit 3a, 3b or 3c, the associated timer 5a, 5b or 5c is first triggered. After that, the timer 5a, 5b or 5c is triggered again each time the AV signal rises at instants $t_2$ and $t_3$. Therefore, each timer is held in the active state to produce the output in the high level during the control operation of the associated anti-skid brake control circuit. When any one of more of the timers 5a, 5b and 5c is thus brought into the active state, the switching transistor $Q_2$ is turned on, so that the switching transistor $Q_1$ is turned off, and the coil 8a of the lock-up solenoid 8 is deenergized. The switching transistor $Q_1$ is in the OFF state as long as any one or more of the timers 5a, 5b and 5c is maintained in the active state. Thus, the lock-up torque converter is maintained in the released state regardless of the control action of the lock-up control circuit 6 while any one or more of the anti-skid brake control circuits 3a, 3b and 3c is performing its anti-skid brake control operation. Accordingly, the control system of the present invention can prevent engine stall, and maintain the anti-skid brake control in order.

It is optional to arrange the timers 5a, 5b and 5c so that they are triggered each time the EV signal rises from the low level to the high level. Furthermore, the timers 5a, 5b and 5c may be omitted. In this case, the EV signals of the anti-skid control circuits 3a, 3b and 3c are inputted to an OR gate, whose output is connected to the base of the switching transistor $Q_2$.

What is claimed is:

1. A vehicle comprising:
   a brake system,
   a condition detecting means for detecting a running condition of the vehicle, said condition detecting means comprising means for sensing a vehicle speed of said vehicle,
   anti-skid brake control means, connected with said condition detecting means, for automatically controlling a brake actuation force during braking in accordance with the running condition detected by said condition detecting means,
   an automatic transmission having a torque converter and a lock-up mechanism to provide a direct mechanical drive,
   lock-up actuating means for actuating said lock-up mechanism, said lock-up mechanism being engaged so that power can be transmitted through said mechanical drive when said lock-up actuating means is in a lock-up state, said lock-up mechanism being disengaged so that power cannot be transmitted through said mechanical drive when said lock-up actuating means is in a release state,
   lock-up control means, connected with said condition detecting means, for engaging and disengaging said lock-up mechanism by putting said lock-up actuating means in said lock-up state and in said release state in accordance with the running condition detected by said condition detecting means, said lock-up control means engaging said lock-up mechanism when said vehicle speed sensed by said vehicle speed sensing means exceeds a predetermined lock-up vehicle speed, and disengaging said lock-up mechanism when said vehicle speed decreases below a predetermined release vehicle speed which is equal to or lower than said lock-up vehicle speed, and lock-up inhibit means for detecting the operation of said anti-skid control means, and holding said lock-up actuating means in said release state by preventing the control action of said lock-up control means while said anti-skid control means is controlling the brake actuation force.

2. A vehicle according to claim 1, wherein said anti-skid brake control means automatically controls the degree of slip of at least one wheel of the vehicle by repeating a cycle of brake application and brake release during braking, and said lock-up inhibit means holds said lock-up actuating means in said release state from the instant at which said anti-skid brake control means starts decreasing the brake actuation force to the instant at which said anti-skid brake control means stops repeating the brake-release cycle.

3. A vehicle according to claim 2, wherein said condition detecting means comprises wheel speed sensing means for sensing angular rotation of at least one wheel of the vehicle.

4. A vehicle according to claim 3, wherein said wheel speed sensing means of said condition detecting means comprises a first wheel speed sensor for sensing angular rotation of a first wheel of the vehicle, said first wheel speed sensor being connected to said lock-up control means, said anti-skid brake control means comprising a first anti-skid actuator for controlling the degree of slip of said first wheel, and a first anti-skid brake controller for controlling said first anti-skid actuator.

5. A vehicle according to claim 4, wherein said brake system is of a hydraulic type, and has a first wheel cylinder for said first wheel, and wherein said first anti-skid actuator is capable of decreasing and increasing the brake fluid pressure supplied to said first wheel cylinder, said first anti-skid controller repeating the brake-release cycle by commanding said first actuator to decrease the fluid pressure by sending a decrease command signal and to increase the fluid pressure by sending an increase command signal.

6. A vehicle according to claim 5, wherein said lock-up inhibit means comprises timer means which is triggered by said anti-skid brake control means each time said anti-skid brake control means performs a predetermined action which is required once in each brake-release cycle, said timer means being driven into an active state when said timer means is triggered, and remaining in said active state until a predetermined time interval is elapsed without being triggered, said lock-up inhibit means preventing the control action of said lock-up control means as long as said timer means is in said active state.

7. A vehicle according to claim 6, wherein said wheel speed sensing means of said condition detecting means further comprises a second wheel speed sensor for sensing angular rotation of a second wheel of the vehicle, wherein said anti-skid brake control means further comprises a second anti-skid actuator for controlling the degree of slip of said second wheel of the vehicle, and a second anti-skid controller for controlling said second anti-skid actuator, and wherein said timer means of said lock-up inhibitor means comprises a first timer triggered by the predetermined action of said first anti-skid controller, and a second timer triggered by the predetermined action of said second anti-skid controller, said lock-up inhibitor means further comprising an OR gate whose inputs are connected, respectively, with said first and second timers, and whose output is in an active state when any one of said first and second timers is in the active state, said lock-up inhibit means preventing the control action of said lock-up control means as long as the output of said OR gate is in the active state.

8. A vehicle according to claim 7, wherein said lock-up control means engages said lock-up mechanism when the vehicle speed determined from the wheel speed sensed by said first wheel speed sensor exceeds a said predetermined lock-up vehicle speed, and disengaged said lock-up mechanism when the vehicle speed decreases below a said predetermined release vehicle speed which is equal to or lower than said predetermined lock-up vehicle speed.

9. A vehicle according to claim 8, wherein said lock-up control means determines a rate of change of the speed of said first wheel, and disengages said lock-up mechanism if the deceleration of said first wheel becomes equal to or greater than a predetermined value.

10. A vehicle according to claim 9, wherein said lock-up control means comprises transmission position sensing means for sensing gear position of said transmission, each of said lock-up speed and said release speed assuming different constant values for the gear positions of said transmission, the value of said lock-up speed of each gear position being greater than the value of said release speed of the same gear position.

11. A vehicle according to claim 10, wherein said first timer is triggered each time said first anti-skid controller produces the decrease command signal, and said second timer is triggered each time said second anti-skid controller produces the decrease command signal.

12. A vehicle according to claim 11, wherein said first and second wheels are front wheels of the vehicle, and wherein said anti-skid control means further comprises a third anti-skid actuator for controlling the degree of slips of rear wheels of the vehicle and a third anti-skid controller for controlling said third anti-skid actuator, said condition detecting means further comprising a third wheel speed sensor for sensing angular rotation of at least one of said rear wheels, said timer means of said lock-up inhibit means further comprising a third timer triggered by the predetermined action of said third anti-skid controller, said third timer being connected to said OR gate so that the output of said OR gate is in the active state when any one or more of said first, second and third timers is in the active state.

13. A vehicle according to claim 5, wherein said wheel speed sensing means of said condition detecting means further comprises a second wheel speed sensor for sensing angular rotation of a second wheel of the vehicle, wherein said anti-skid brake control means further comprises a second anti-skid actuator for controlling the degree of slip of said second wheel and a second anti-skid controller for controlling said second anti-skid actuator, and wherein said lock-up inhibit means comprises an OR gate whose input terminals are connected with said first and second anti-skid controller and whose output is in an active state when any one or more of said first and second anti-skid controller is in a state to command the actuator not to increase the brake fluid pressure, said lock-up control means preventing the control action of said lock-up control means as long as the output of said OR gate is in the active state.

14. A vehicle accoding to claim 7, wherein said lock-up actuating means comprises a first switching transistor having a base terminal connected with said lock-up control means, said first transistor being turned on by a signal produced by said lock-up control means to actuate said lock-up mechanism, said lock-up inhibitt means further comprising a second switching transistor having a base terminal connected with the output terminal of said OR gate, a collector terminal connected with the base terminal of said first switching transistor, and an emitter terminal which is grounded.

* * * * *